United States Patent [19]

Cook

[11] 4,046,216
[45] Sept. 6, 1977

[54] SEGMENT FOR SEGMENTED SKIRT OF A GAS CUSHION VEHICLE

[75] Inventor: Robert Alastair Cook, Southampton, England

[73] Assignee: Mackley Ace Limited, Brighton, England

[21] Appl. No.: 665,942

[22] Filed: Mar. 11, 1976

[30] Foreign Application Priority Data

June 10, 1975 United Kingdom ............... 24818/75

[51] Int. Cl.² .............................................. B60V 1/16
[52] U.S. Cl. ................................. 180/127; 180/124
[58] Field of Search ............... 180/116, 121, 124, 127, 180/128; 280/743

[56] References Cited

U.S. PATENT DOCUMENTS

| | | | |
|---|---|---|---|
| 3,321,039 | 5/1967 | Watts | 180/127 |
| 3,397,753 | 8/1968 | Hunt | 180/127 |
| 3,409,103 | 11/1968 | Tripp | 180/127 |
| 3,520,381 | 7/1970 | Pinder | 180/127 |

FOREIGN PATENT DOCUMENTS

| | | | |
|---|---|---|---|
| 1,571,332 | 6/1969 | France | 180/127 |
| 1,236,571 | 6/1971 | United Kingdom | 180/124 |

*Primary Examiner*—Joseph F. Peters, Jr.
*Assistant Examiner*—Terrance L. Siemens
*Attorney, Agent, or Firm*—McNenny, Pearne, Gordon, Gail, Dickinson & Schiller

[57] ABSTRACT

The invention relates to a segment for forming part of a segmented flexible skirt for use on craft, vehicles or devices which can be supported on a cushion of pressurized fluid, comprising a sheet of flexible material folded into a substantially U-shape in plan view to form a curved front wall portion having an upper end and side wall portions having an upper end and a bottom end, said side wall portions in side elevation tapering from their said upper end towards their said bottom end, an upper portion of said front wall portion which extends from said upper end of the front wall portion being in a plane which lies at an angle relative to the remainder of the front wall portion.

21 Claims, 8 Drawing Figures

U.S. Patent    Sept. 6, 1977    4,046,216
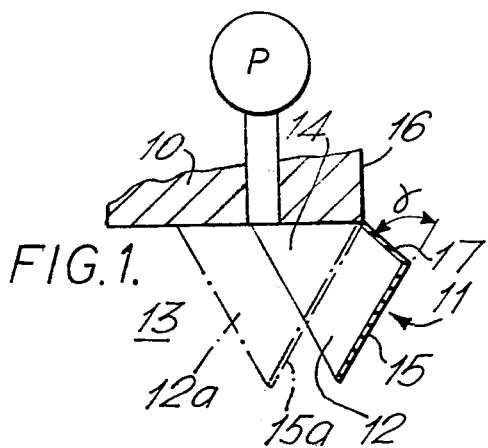
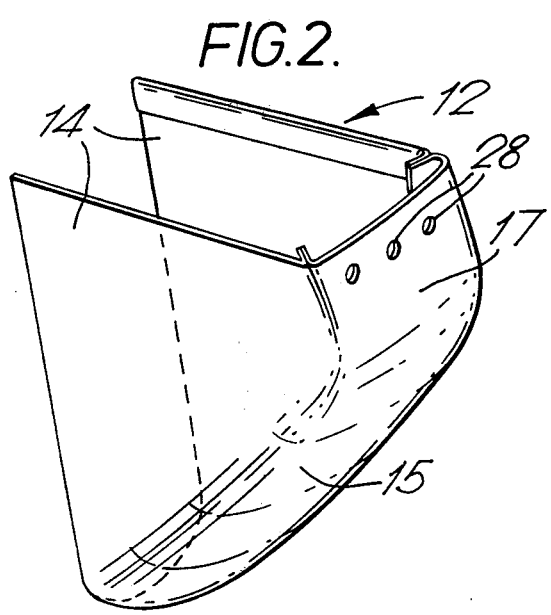
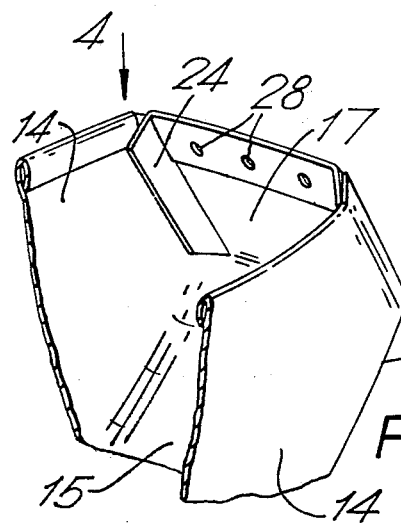
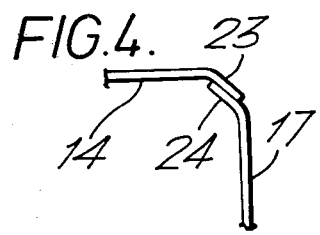
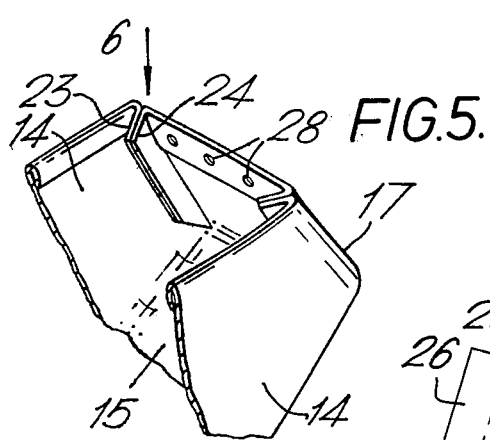
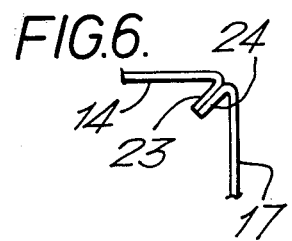
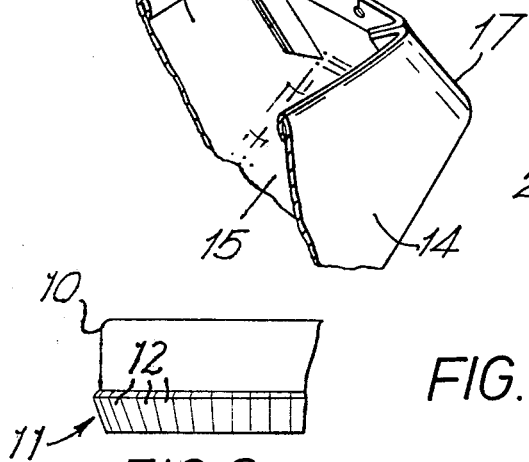
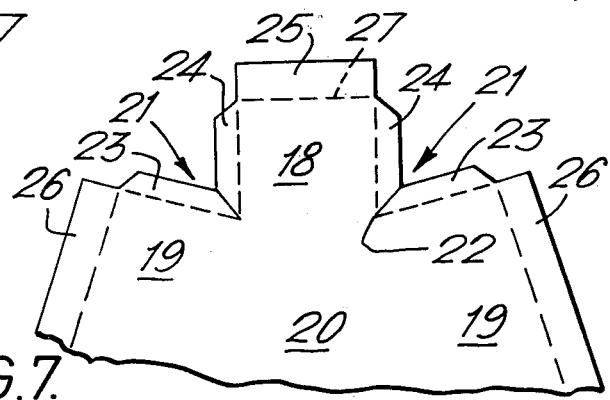

SEGMENT FOR SEGMENTED SKIRT OF A GAS CUSHION VEHICLE

BACKGROUND OF THE INVENTION

This invention relates to a segment for forming part of a segmented flexible skirt for use on craft, vehicles or devices which can be supported on a cushion pressurized fluid, and which in use serves to prevent or reduce an escape of fluid from the cushion to the atmosphere. The invention also relates to a segmented flexible skirt and to a craft, vehicle or device provided with such a skirt.

It is known to have segmented flexible skirts which comprises a plurality of juxtaposed downwardly extending segments which in use seal one against the other and which are substantially U-shaped in transverse horizontal cross-section and gradually taper from their upper end to their lower end so that in side view they are triangular. The curved front wall portion of each segment is usually straight and when fitted to a craft, vehicle or device its upper end extends from the outer edge of the structure of the craft, vehicle or device. Consequently the volume of the plenum chamber for the cushion of pressurized fluid is at a maximum when the upper end of the front wall portion of each segment is at the edge of the structure.

SUMMARY OF THE INVENTION

This invention relates generally as indicated to a segment for forming part of a segmented flexible skirt for use on craft, vehicles or devices which can be supported on a cushion of pressurized fluid, and which in use serves to prevent or reduce an escape of fluid from the cushion to atmosphere.

An object of the present invention is to provide a segment in which the curved front wall portion can be located beyond the outer edge of the structure of the craft, vehicle or device, thus enabling the volume of the plenum chamber to be increased beyond that normally dictated by the edge of the structure.

According to the present invention in one aspect there is provided a segment for forming part of a segmented flexible skirt for use on craft, vehicles or devices which can be supported on a cushion of pressurized fluid, comprising a sheet of flexible material folded into a substantially U-shap in plan view to form a curved front wall portion and side wall portions which in side elevation taper from their upper end towards their bottom end, an upper portion of the front wall portion extending from the upper end being in a plane which lies at an angle relative to the remainder of the front wall portion.

Preferably each side wall portion is provided with a pleat or tuck or with a cut out portion whose edges have been brought into over-lapping relation and secured together to bring said upper portion in said plane.

According to the present invention in another aspect there is provided a segmented flexible skirt for use on a craft, vehicle or device which can be supported on a cushion of pressurized fluid, said skirt comprising a plurality of juxtaposed segments as defined above.

The invention also relates to a craft, vehicle or device which can be supported on a cushion of pressurized fluid and provided with a segmented flexible skirt as defined above.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail a certain illustrative embodiment of the invention, this being indicative of but one way in which the principle of the invention may be employed.

In said annexed drawings:

FIG. 1 is a diagrammatic section through a segment according to the present invention secured to a fluid cushion supported craft, vehicle or device, FIG. 2 is a diagrammatic perspective view of the segment, FIG. 3 is a diagrammatic perspective view from above of part of the segment, FIG. 4 is a plan view of one corner taken in the direction of the arrow 4 indicated in FIG. 3, FIG. 5 is a view similar to that of FIG. 3 but showing a modification, FIG. 6 is a plan view of one corner taken in the direction of the arrow 6 indicated in FIG. 5, and FIG. 7 is a partial plan view of a sheet of flexible material from which the segment is formed and FIG. 8 is a fragmentary elevational view of a craft supported by a structure in accordance with this invention.

DESCRIPTION OF THE PREFERRED EMBODIMENT

Referring firstly to FIG. 1, the structure of a craft, vehicle or device which can be supported on a cushion of pressurized fluid is indicated at 10. Secured to the structure 10 is a skirt 11 comprising a plurality of juxtaposed vertically downwardly extending segments 12 which are formed of a flexible material. The upper edges of the segments 12 are secured to the structure 10 by any suitable means, not shown. The space formed between the surface contacted by the bottom end of the segments 12 and the underside of the structure 10 and enclosed within the skirt 11 constitutes a plenum chamber 13 to which a fluid such as a gas, preferably air, under pressure if supplied from a pump p to form a gas cushion. When compressed fluid is fed to the plenum chamber 13 the sides of adjacent segments 12 seal against each other to form a fluid seal. The fluid under pressure may comprise water.

The segments 12 are substantially U-shaped in plan view and have side wall portions 14 which gradually taper from their upper end to their bottom end, and a curved front wall portion 15. The segment 12a shown in dash-dotted lines in FIG. 1 is a conventional known segment in which the curved front wall portion 15a is straight and its upper end extends from the outer edge 16 of the structure 10. Consequently the volume of the plenum chamber 13 is at a maximum and cannot be increased as the front wall portion 15a cannot be moved further outwardly relative to the outer edge 16. The segments 12 according to the present invention can have their front wall portion 15 located further outwardly than the known segments 12a and the front wall portion 15 may be located beyond the outer edge 16 and thus the volume of the plenum chamber 13 can be increased beyond that usually dictated by the outer edge 16.

Embodiments of segments 12 according to the present invention will now be described with reference to the remaining Figures. Each segment 12 as stated before is substantially U-shaped in plan view and has a curved front wall portion 17 which extends from the upper end of the segment and is in a plane which lies at an angle α relative to the remainder of the front wall portion 15. The angle α may be such that the portion 17 extends outwardly from the outer edge 16, as shown in FIG. 1, or it may be in a vertical plane, i.e. extends vertically downwardly from the outer edge 16. By providing the upper portion 17 ensures that the remainder of the front wall portion 15 is moved outwardly compared with the front wall portion 15a of the known segment 12a.

The upper portion 17 of the front wall portion 15 may be held at the desired angle α by providing pleats or tucks in the side wall portions 14 and securing the overlapping portions of the pleats or tucks together by any suitable means, i.e. by an adhesive and/or by stitching or by welding or by stapling or bolting.

Preferably the segment 12 is formed from a flat sheet of flexible material which is laid flat and cut to a desired pattern as shown in FIG. 7. The portion 18 of the flat sheet is used to form the upper portion 17, the portions 19 are used to form the side wall portions 14 and the mid portion 20 is used to form the front wall portion 15.

The sheet is provided with two V-shaped cut-out portions 21 provided with a slit 22 to form seam portions 23 and 24. The portion 18 is extended by a portion 25 and the portions 19 are extended by portions 26.

In forming the segment 12, the portion 25 is folded along a line 27 and secured to the portion 18. Apertures 28 are then formed in the overlapping parts of portions 25 and 18. The portions 26 are folded back onto the respective portion 19 and secured thereto to form a channel into which rods (not shown) for fixing the segment to the structure 10 can be inserted. The portions 19 are then brought towards each other to form the U-shape and the seam portions 23 are placed in overlapping relationship with the seam portions 24 and secured together. The seam portions 23 and 24 may simply overlap as shown in FIGS. 3 and 4 or they may be inwardly directed as shown in FIGS. 5 and 6.

Instead of providing the cut-out portions 21, the side wall portions can be provided with a tuck or pleat adjacent the front wall portion.

The sheet of material from which the segments 12 are formed may comprise nylon or material sold under the Registered Trade Mark "TERYLENE" coated with a natural or synthetic rubber, for example neoprene, or P.V.C. or polyurethane.

The folded over parts of the sheet may be secured together by an adhesive and/or stitching or welding or stapling or bolting.

I, therefore, particularly /point out and distinctly claim as my invention:

1. A segment for forming part of a segmented flexible skirt for use on craft, vehicles or devices which can be supported on a cushion of pressurized fluid, comprising a sheet of flexible material folded into a substantially U-shape in plan view to form a curved front wall portion having an upper end and side wall portions having an upper end and a bottom end, said wall portions in side elevation tapering from their said upper end towards their said bottom end, an upper portion of said front wall portion which extends from said upper end of the front wall portion being in a plane which lies at an angle relative to the remainder of the front wall portion, each side wall being provided adjacent its upper end with a pleat or tuck to bring said upper portion of the front wall portion into said plane, said pleat or tuck having overlapping portions which are secured together.

2. A segment as claimed in claim 1, wherein said sheet of flexible material is formed of plastic material.

3. A segment as claimed in claim 1, wherein said sheet of flexible material is formed of nylon.

4. A segment as claimed in claim 1, wherein said sheet of flexible material is coated with rubber.

5. A segment as claimed in claim 1, wherein said sheet of flexible material is coated with a plastic material.

6. A segmented flexible skirt for use on craft, vehicles or devices which can be supported on a cushion of pressurized fluid, comprising a plurality of juxtaposed segments, each segment comprising a sheet of flexible material folded into a substantially U-shape in plan view to form a curved front wall portion having an upper end and side wall portions having an upper end and a bottom end, said side wall portions in side elevation tapering from their said upper end towards their said bottom end, an upper portion of said front wall portion which extends from said upper end of the front wall portion being in a plane which lies at an angle relative to the remainder of the front wall portion, each side wall portion of each segment being provided adjacent its upper end with a pleat or tuck to bring said upper portion of the front wall portion into said plane, said pleat or tuck having overlapping portions which are secured together.

7. A segmented flexible skirt as claimed in claim 6, wherein each segment is formed from a sheet of flexible plastic material.

8. A segmented flexible skirt as claimed in claim 6, wherein each segment is formed from a sheet of nylon.

9. A segmented flexible skirt as claimed in claim 6, wherein each segment is formed from a sheet of flexible material coated with rubber.

10. A segmented flexible skirt as claimed in claim 8, wherein each segment is formed from a sheet of flexible material coated with plastics material.

11. A craft, vehicle or device comprising a body portion having an underside, a segmented flexible skirt attached to said body portion and extending below the underside of said body portion, a plenum chamber defined by said underside of said body portion and said skirt, and means for supplying fluid under pressure to said plenum chamber to form a cushion of pressurized fluid on which the craft, vehicle or device is supported, said segmented flexible skirt comprising a plurality of juxtaposed segments, each segment comprising a sheet of flexible material folded into a substantially U-shape in plan view to form a curved front wall portion having an upper end and side wall portions having an upper end and a bottom end, said side wall portions in side elevation tapering from their said upper end towards their said bottom end, an upper portion of said front wall portion which extends from said upper end of the front wall portion being in a plane which lies at an angle relative to the remainder of the front wall portion, each side wall being provided adjacent its upper end with a pleat or tuck to bring said upper portion of the front wall portion into said plane, said pleat or tuck having overlapping portions which are secured together.

12. A segment for forming part of a segmented flexible skirt for use on craft, vehicles, or devices which can be supported on a cushion of pressurized fluid, comprising a sheet of flexible material folded into a substantially U-shape in plan view to form a curved front wall portion having an upper end and side wall portions having an upper end and a bottom end, said side wall portions in side elevation tapering from their said upper end towards their said bottom end, an upper portion of said front wall portion which extends from said upper end of the front wall portion being in a plane which lies at an angle relative to the remainder of the front wall portion, each side wall portion being provided adjacent its upper end with a cutout portion having edges which have been brought into overlapping relation in order to bring said upper portion of the front wall portion in said plane, the overlapping edges being secured together.

13. A segment as claimed in claim 12, wherein said sheet of flexible material is formed of plastic material.

14. A segment as claimed in claim 12, wherein said sheet of flexible material is formed of nylon.

15. A segment as claimed in claim 12, wherein said sheet of flexible material is coated with rubber.

16. A segment as claimed in claim 12, wherein said sheet of flexible material is coated with a plastic material.

17. A segmented flexible skirt for use on craft, vehicles, or devices which can be supported on a cushion of pressurized fluid, comprising a plurality of juxtaposed segments each segment comprising a sheet of flexible material folded into a substantially U-shape in plan view to form a curved front wall portion having an upper end and side wall portions having an upper end and a bottom end, said side wall portions in side elevation tapering from their said upper end towards their said bottom end, an upper portion of said front wall portion which extends from said upper end of the front wall portion being in a plane which lies at an angle relative to the remainder of the front wall portion, each side wall portion of each segment being provided adjacent its upper end with a cutout portion having edges which have been brought into overlapping relation in order to bring said upper portion of the front wall portion in said plane, the overlapping edges being secured together.

18. A segmented flexible skirt as claimed in claim 17, wherein each segment is formed from a sheet of flexible plastic material.

19. A segmented flexible skirt as claimed in claim 17, wherein each segment is formed from a sheet of nylon.

20. A segmented flexible skirt as claimed in claim 17, wherein each segment is formed from a sheet of flexible material coated with rubber.

21. A segmented flexible skirt as claimed in claim 17, wherein each segment is formed from a sheet of flexible material coated with plastic material.

* * * * *

UNITED STATES PATENT AND TRADEMARK OFFICE
CERTIFICATE OF CORRECTION

PATENT NO. : 4,046,216
DATED : September 6, 1977
INVENTOR(S) : Robert Alastair Cook It is certified that error appears in the above-identified patent and that said Letters Patent are hereby corrected as shown below:

Column 1, line 8, "cushion pressur-" should be --cushion of pressur- --.

Column 1, line 48, "U-shap" should be --U-shape--.

Column 4, line 38, "claim 8" should be --claim 6--.

Column 4, line 40, "plastics" should be --plastic--.

Signed and Sealed this

Twenty-first Day of March 1978

[SEAL]

Attest:

RUTH C. MASON
Attesting Officer

LUTRELLE F. PARKER
Acting Commissioner of Patents and Trademarks